United States Patent
Tymczuk et al.

(10) Patent No.: US 10,935,995 B2
(45) Date of Patent: Mar. 2, 2021

(54) FORCE EQUILIBRIUM OF A VALVE ROD DUE TO INTERNAL PRESSURE EQUALIZATION

(71) Applicant: Honeywell International Inc., Morris Plains, NJ (US)

(72) Inventors: Bartosz Andrzej Tymczuk, Frankfurt am Main (DE); Maxim Golzew, Geesthacht (DE); Jörg Brendel, Breuna (DE)

(73) Assignee: Honeywell International Inc., Morris Plains, NJ (US)

( * ) Notice: Subject to any disclaimer, the term of this patent is extended or adjusted under 35 U.S.C. 154(b) by 118 days.

(21) Appl. No.: 15/948,774

(22) Filed: Apr. 9, 2018

(65) Prior Publication Data
US 2019/0310665 A1    Oct. 10, 2019

(51) Int. Cl.
| | |
|---|---|
| *G05D 16/02* | (2006.01) |
| *F16K 17/30* | (2006.01) |
| *F16K 17/06* | (2006.01) |
| *F16K 17/04* | (2006.01) |
| *F16K 37/00* | (2006.01) |

(52) U.S. Cl.
CPC .............. *G05D 16/02* (2013.01); *F16K 17/04* (2013.01); *F16K 17/065* (2013.01); *F16K 17/30* (2013.01); *F16K 37/005* (2013.01)

(58) Field of Classification Search
CPC ....... G05D 16/02; F16K 37/005; F16K 17/04; F16K 17/065; F16K 17/30
USPC ........................................................ 137/462
See application file for complete search history.

(56) References Cited

U.S. PATENT DOCUMENTS

| 298,687 | A | | 5/1884 | Gooding |
|---|---|---|---|---|
| 1,750,206 | A | | 3/1930 | Edmund |
| 4,126,152 | A | * | 11/1978 | Kirk ...................... G05D 16/02 |
| | | | | 137/596.18 |
| 4,300,586 | A | | 11/1981 | Thuries et al. |
| 4,541,454 | A | | 9/1985 | Sturman et al. |
| 8,281,804 | B2 | | 10/2012 | Lin et al. |
| 9,879,799 | B2 | | 1/2018 | Matteucci |
| 2016/0208941 | A1 | | 7/2016 | Amadini et al. |
| 2016/0281871 | A1 | | 9/2016 | Kobayashi et al. |
| 2016/0281872 | A1 | | 9/2016 | Kobayashi et al. |

(Continued)

FOREIGN PATENT DOCUMENTS

| DE | 3614818 C1 | 4/1987 |
|---|---|---|
| EP | 2166423 A1 | 3/2010 |

OTHER PUBLICATIONS

Extended European Search Report dated Aug. 9, 2019 for corresponding EP Application No. 19166917.5.

*Primary Examiner* — P. Macade Nichols (57) ABSTRACT

An apparatus includes a safety shut-off valve for use with a gas regulator. The safety shut-off valve includes a housing, a valve rod, a vent chamber, and a vent line. The housing includes an interior chamber configured to regulated pressure in a fluid. The valve rod is disposed in the housing and controls a valve for interrupting the fluid in the internal chamber. The vent chamber receives ambient air and maintains pressure equalization of the ambient air and the fluid within a maximum pressure of the fluid. The vent line is disposed in a center of the valve rod and provides fluid communication of the ambient air between the vent chamber and an outside of the housing.

20 Claims, 9 Drawing Sheets

(56) References Cited

U.S. PATENT DOCUMENTS

2016/0281873 A1  9/2016  Yoshioka
2017/0153653 A1  6/2017  Hata et al.
2017/0351275 A1  12/2017  Ito et al.

* cited by examiner

FORCE EQUILIBRIUM OF A VALVE ROD DUE TO INTERNAL PRESSURE EQUALIZATION

TECHNICAL FIELD

This disclosure relates generally to gas pressure regulators. More specifically, this disclosure relates to a force equilibrium of a valve rod due to internal pressure equalization.

BACKGROUND

High pressure in a main valve housing causes essential forces on the casing wall and all components located inside. As long as the whole part is inside the casing, no difficulties are expected from the essential forces.

For example, a guided valve rod is installed in such a housing. Rotatory and transitory motion of the valve rod is possible. The applied pressure ($p_u$ or $p_d$) inside the housing causes forces on a part (e.g. vale rod, valve stem, shaft, etc.) that intrudes into a housing, but does not penetrate it completely. In this case, a kind of imbalance is experienced due to a different pressure inside the housing and the ambient pressure outside it. Regarding a pressure increase and enlargement of the valve rod sectional cross area, the imbalance has an exponential impact on big forces. In order to avoid this disequilibrium, a pressure equalization is needed.

SUMMARY

This disclosure provides a force equilibrium of a valve rod due to internal pressure equalization.

In a first embodiment, a regulator includes a housing, a valve rod, a vent chamber, and a vent line. The housing includes an internal chamber regulates pressure in a fluid. The valve rod is located in the housing and controls a valve for interrupting the fluid in the internal chamber. The vent chamber receives ambient air and maintains pressure equalization of the ambient air and the fluid within a maximum pressure of the fluid. The vent line is located in a center of the valve rod and provides fluid communication of the ambient air between the vent chamber and an outside of the housing.

In a second embodiment, a valve rod is located in a housing of a safety shut-off valve for use with a gas regulator. The valve rod controls a valve for regulating fluid in an internal chamber of the housing. The valve rod includes a vent chamber and a vent line. The vent chamber receives ambient air and maintains pressure equalization of the ambient air and a fluid within a maximum pressure of the fluid. The vent line is located in a center of the valve rod and provides fluid communication of the ambient air between the vent chamber and an outside of the housing.

In a third embodiment, a method includes providing fluid communication of ambient air between a vent chamber in a housing of a safety shut-off valve and an outside of the housing; receiving ambient air in the vent chamber; receiving fluid in an internal chamber in the housing; maintaining pressure equalization of the ambient air and the fluid within a maximum pressure of the fluid; and interrupting the fluid received in the internal chamber using a valve connected to a valve rod.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

A imbalance or disequilibrium issue is applied to respective standards Deutsches Institu Fur Normung (DIN EN) 334 and DIN EN 14382 for gas pressure regulators and safety devices for gas pressure regulating station and installations, which includes gas safety shut-off devices for inlet pressures up to 100 bar.

Gas pressure regulators (also known as gas regulators, pressure control valves, or pressure regulating valves) regulate the pressure in a high pressure gas system. A gas regulator allows high pressure gas to flow into an orifice, and when the gas exits the valve, the gas pressure is reduced or stabilized or both. Generally, a flexible diaphragm is attached to a disk by a mechanical linkage. The diaphragm covers an internal chamber such that one side of the diaphragm is exposed to loading pressure and the other side of the diaphragm is exposed to the inlet pressure. The high pressure gas flows through an inlet orifice that can be opened and closed by the disk and the linkage, which are attached to the diaphragm. The diaphragm is also attached to a closing spring. The diaphragm moves in response to the balance of the set pilot loaded pressure and the outlet pressure.

Typically gas pressure regulators are purely mechanical devices that regulate gas pressure. Certain gas pressure regulators are electro-mechanical, pneumatic, or electro-pneumatic that operate a gas pressure regulator under a process change condition. For example, an electro-mechanical gas pressure regulator regulates and controls pressure of the gas at the outlet. Controlling pressure can be achieved by a predetermined remote set-point adjustment and establishing automatic load limiting states. In another example, an electrical sensor can be added to a gas pressure regulator that can notify an operator when the device fails. However, in an industrial process environment, when a gas pressure regulator fails, the process can be forced to shut down. Various industrial process environments often utilize a redundancy system such that when the active pressure regulator valve fails, a backup is already in the system to regulate the gas pressure eliminating any down time.

Figure 1:
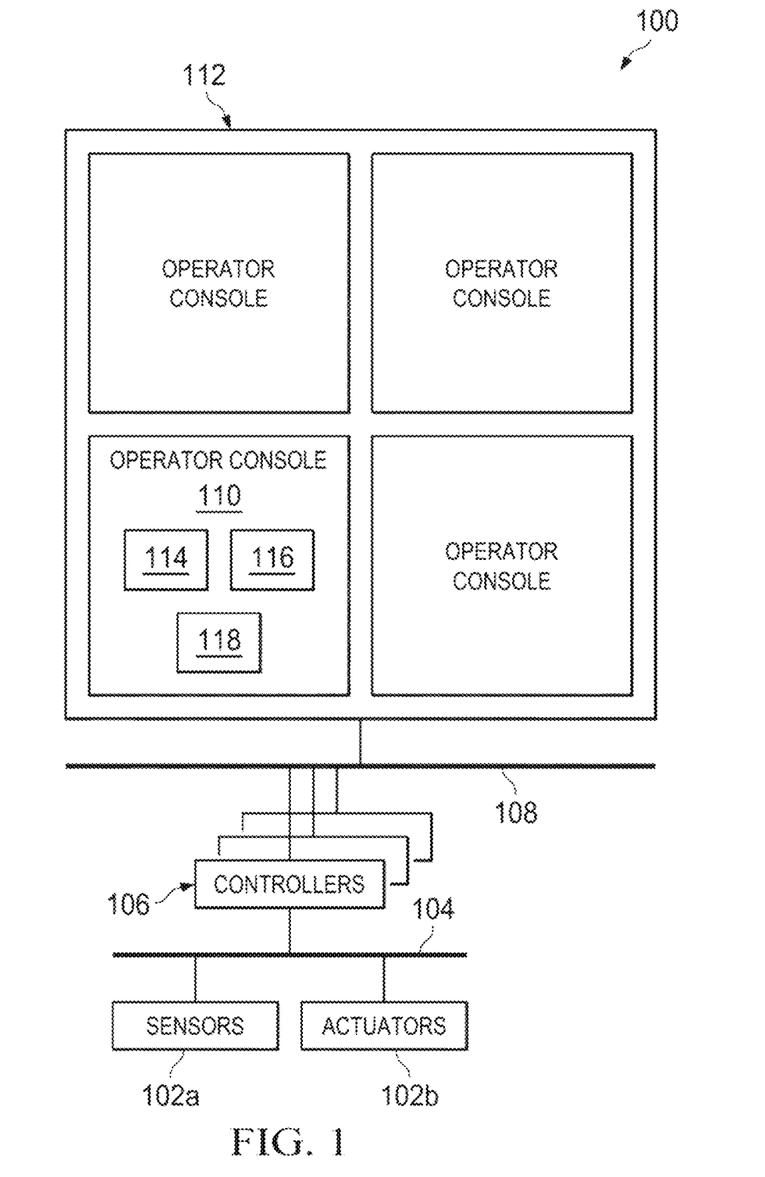
FIG. 1 illustrates an example industrial process control and automation system according to this disclosure.

Generally, gas pressure regulators vibrate as the devices exhibit unstable tendencies. For example, gas pressure regulators often vibrate, or hum while in use. In certain embodiments, the vibrations increase based on the flow rate, pressure, temperature as well as the physical parameters of the gas pressure regulator. Physical parameters can include the volume of the various compartments within the gas pressure regulator as well as the size of the inlet and outlet piping. The frequency of the vibrations or humming of a gas pressure regulator can provide an indication as to the longevity of the gas pressure regulator. For example, if the frequency of the vibrations remains steady, then the gas pressure regulator is not in risk of failing. In contrast, if the frequencies of the vibrations are not steady or the magnitude of the frequency changes, then the pressure regulator could be in risk of failing. Many factors affect the frequency of vibrations such as the flow rate of the gas, the pressure and temperature of the gas as it flows through the gas pressure regulator FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

At least one of the sensors 102a in FIG. 1 could represent a gas pressure regulator. As noted above, the gas pressure regulator experience high pressures that put strong forces on the internal components.

In accordance with this disclosure, a technique is provided for reducing the forces experienced by the internal pressure at a valve rod. The vent line of the gas pressure regulator is relocated through the valve rod and out of the gas regulator at the base.

Additional details regarding the gas pressure regulator having a force equilibrium of the valve rod due to internal pressure equalization. Note that these details relate to specific implementations of the gas pressure regulator and that other implementations could vary as needed or desired.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a pressure sensor could be used.

Figure 2:
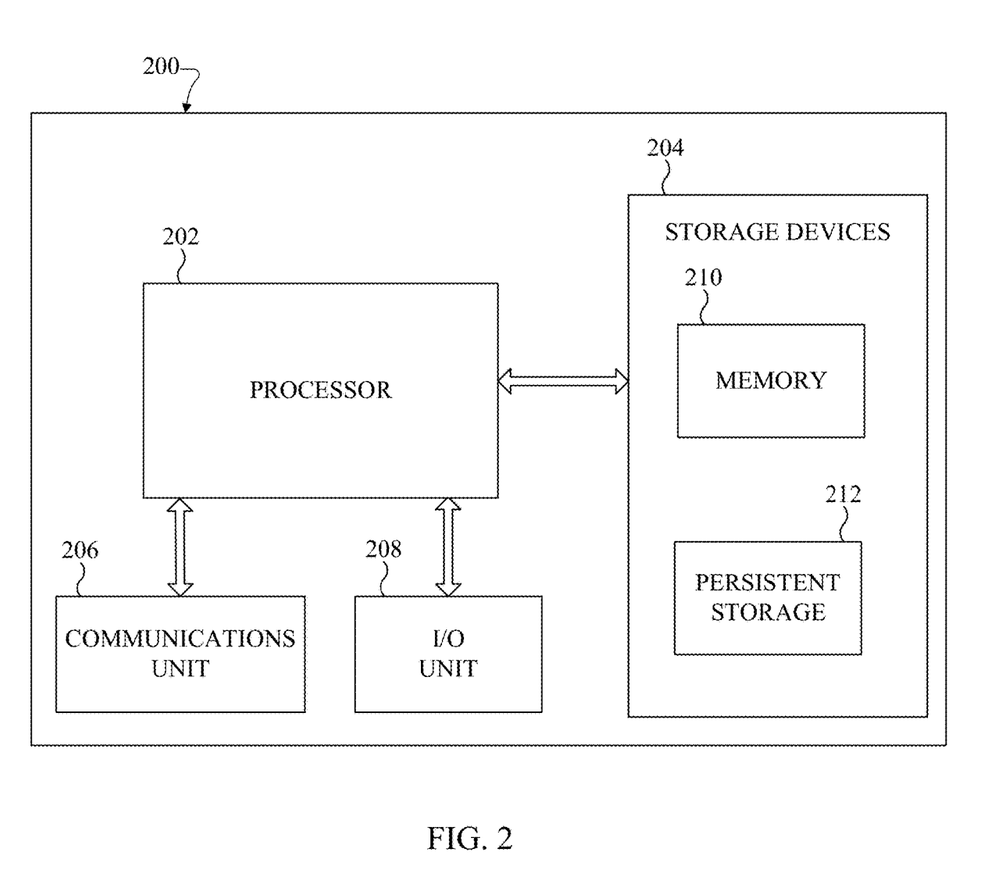
FIG. 2 illustrates an example device for force equilibrium of a valve rod to internal pressure equalization according to this disclosure.

FIG. 2 illustrates an example device for force equilibrium of a valve rod due to internal pressure equalization according to this disclosure. In particular, FIG. 2 illustrates an example computing device 200. In some embodiments, the computing device 200 could denote an operator station, server, a remote server or device, or a mobile device. The computing device 200 could be used to run applications. The computing device 200 could be used to perform one or more functions, such as monitoring vibrations of a gas pressure regulator, generating and transmitting a notification based on the operational status of a gas pressure regulator, or recording and transmitting the vibrations associated with a gas pressure regulator. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Figure 3A:
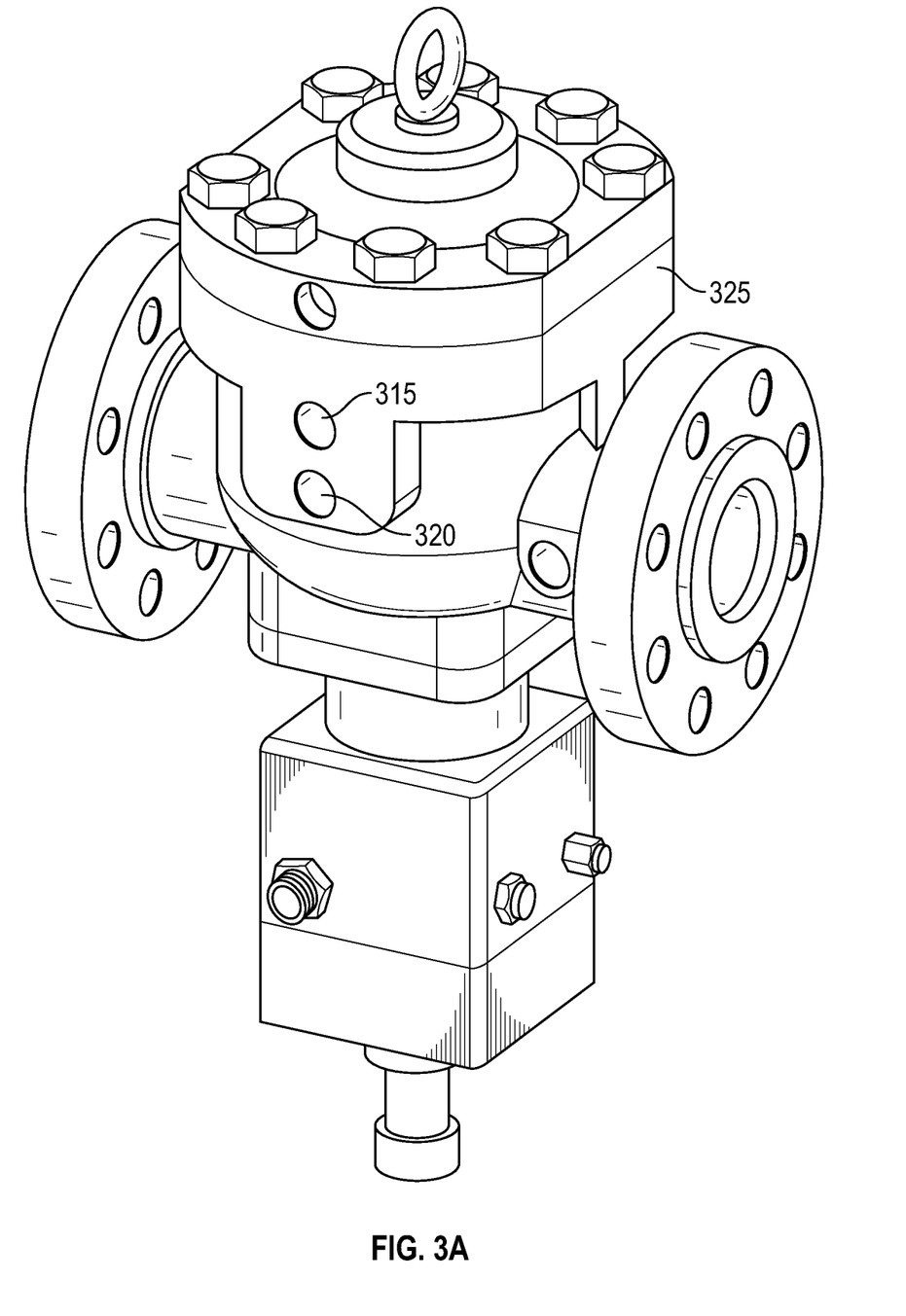
FIG. 3 illustrates a gas regulator with an external vent line according to this disclosure.
Figure 3B:
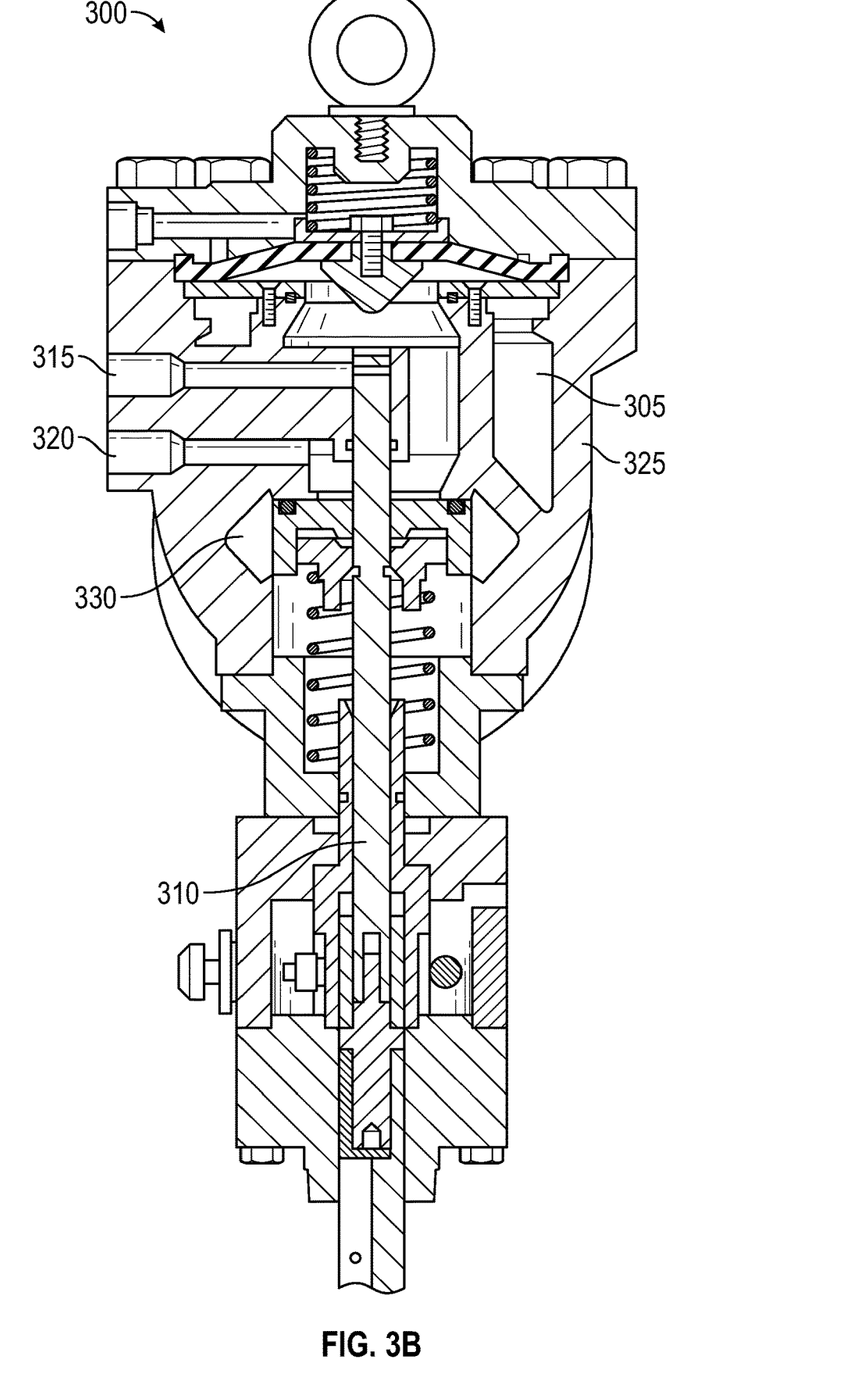

FIG. 3 illustrates a gas regulator 300 with an external vent line according to this disclosure. The embodiment of the gas regulator 300 illustrated in FIG. 3 is for illustration only. FIG. 3 does not limit the scope of this disclosure to any particular implementation.

The gas regulator 300 provides accurate and reliable pressure reduction for an industrial process control and automation system 100. The gas regulator includes an internal chamber 305, a valve rod 310, a vent line 315, an impulse line 320, and a housing 325. The gas regulator 300 is used to ensure a reduced outlet pressure while providing a steady flow downstream.

The internal chamber 305 receives the fluid flow for the gas regulator 300. The internal chamber 305 includes a diaphragm for pressure reduction/pressure regulating issue.

The valve rod 310 controls a valve 330 for interrupting the fluids/flow rate. The valve rod 310 is located in the center of the gas regulator 300.

The vent line 315 is used to vent excess pressure buildup in the internal chamber above the valve rod. The vent line is located above the impulse line 320. The vent line runs to the inside of the internal chamber.

The impulse line 320 is used for pressure supply of the pilot. The impulse line 320 is connected to a closest part of the internal chamber 305 a perpendicular distance from the outside wall of the gas regulator 300.

A sensor 102a, such as a pressure sensor, for a device 200 can be connected to the impulse line 320. The sensor 102a can mount to a pilot at one side of the gas regulator 300. The sensor 102a detects the pressure of the internal chamber 305 through the impulse line 320. The device 200 receives the sensor reading and can provide the reading to a user or use the sensor reading to manipulate the gas regulator or other portions of the industrial process control and automation system 100.

Figure 4A:
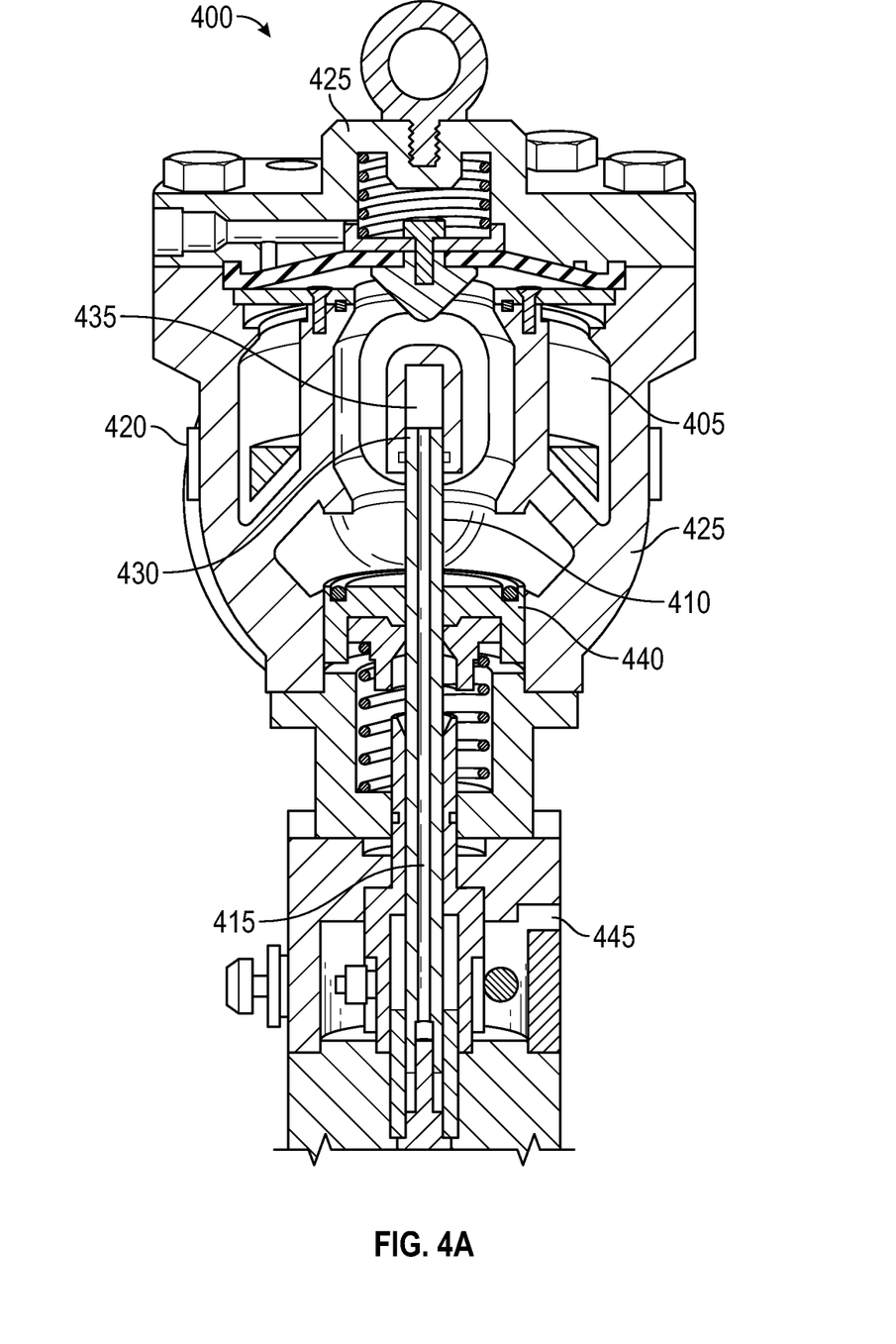
FIGS. 4A, 4B, 4C, and 4D illustrate an example gas regulator for increased flow rate according to this disclosure.
Figure 4B:
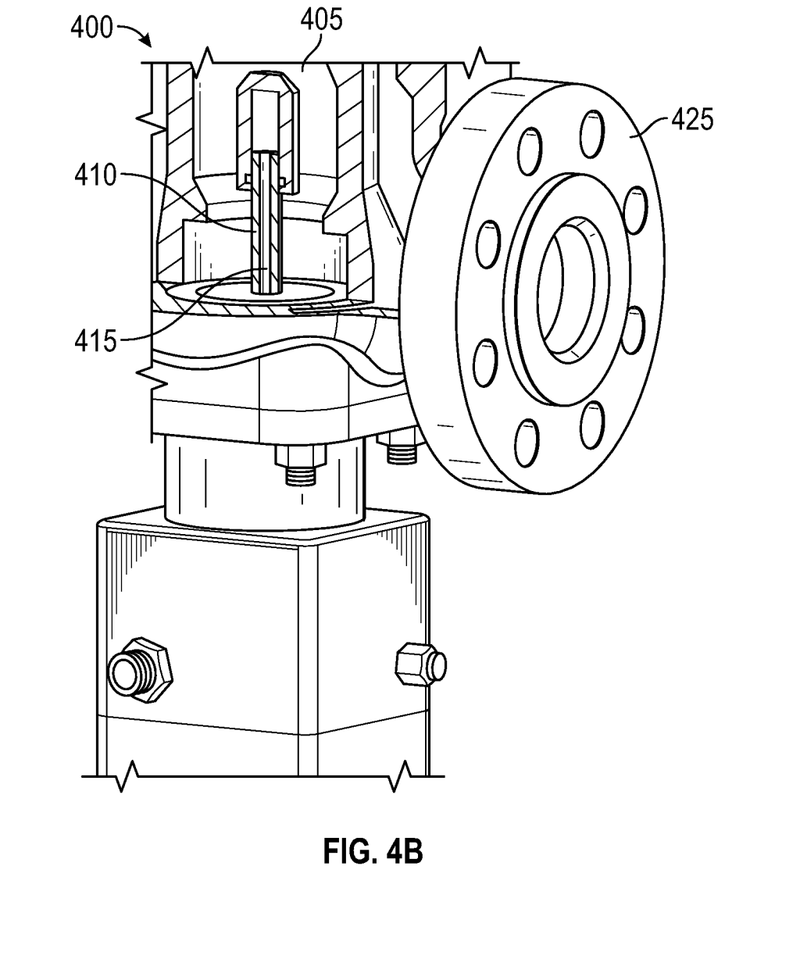
Figure 4C:
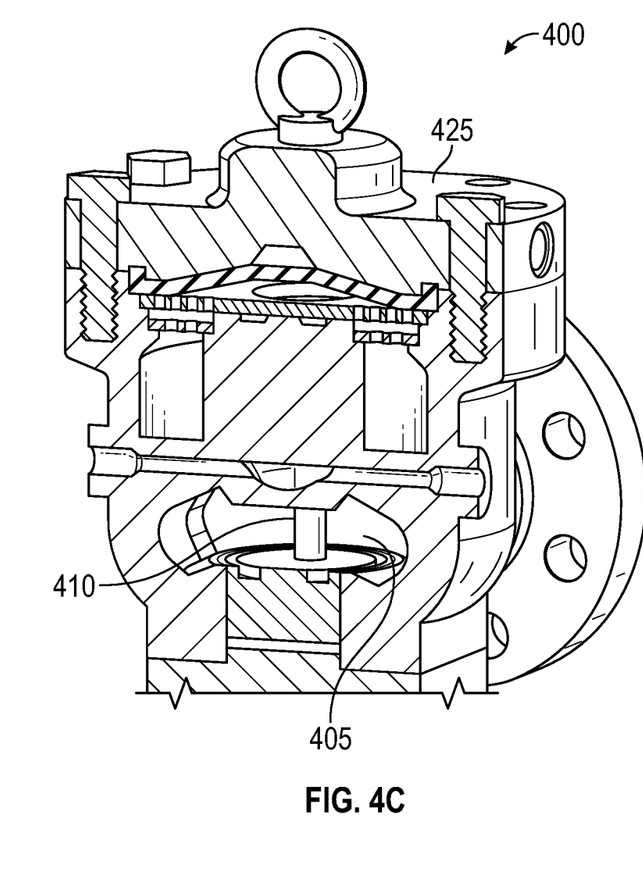
Figure 4D:
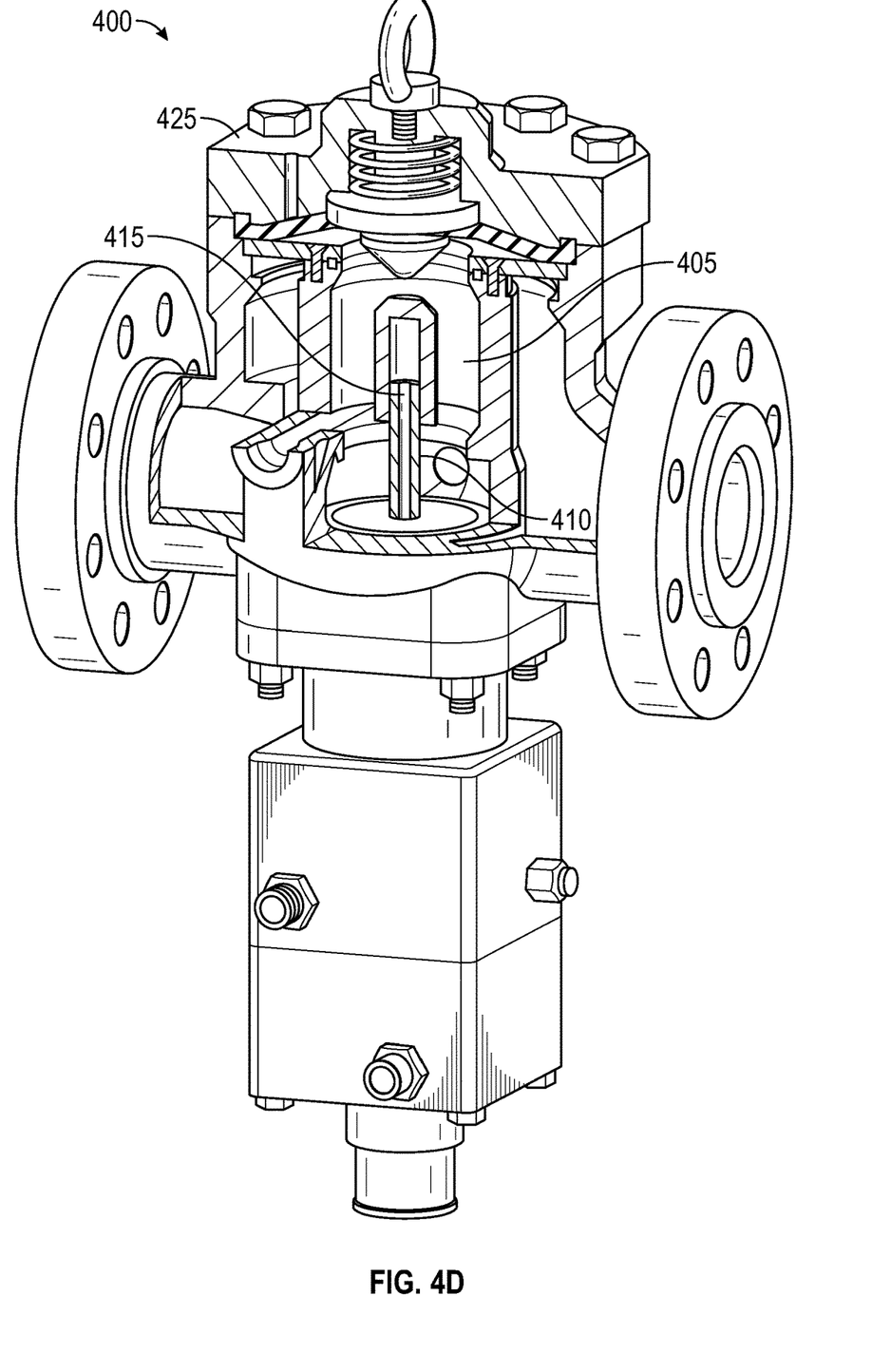
Figure 4E:
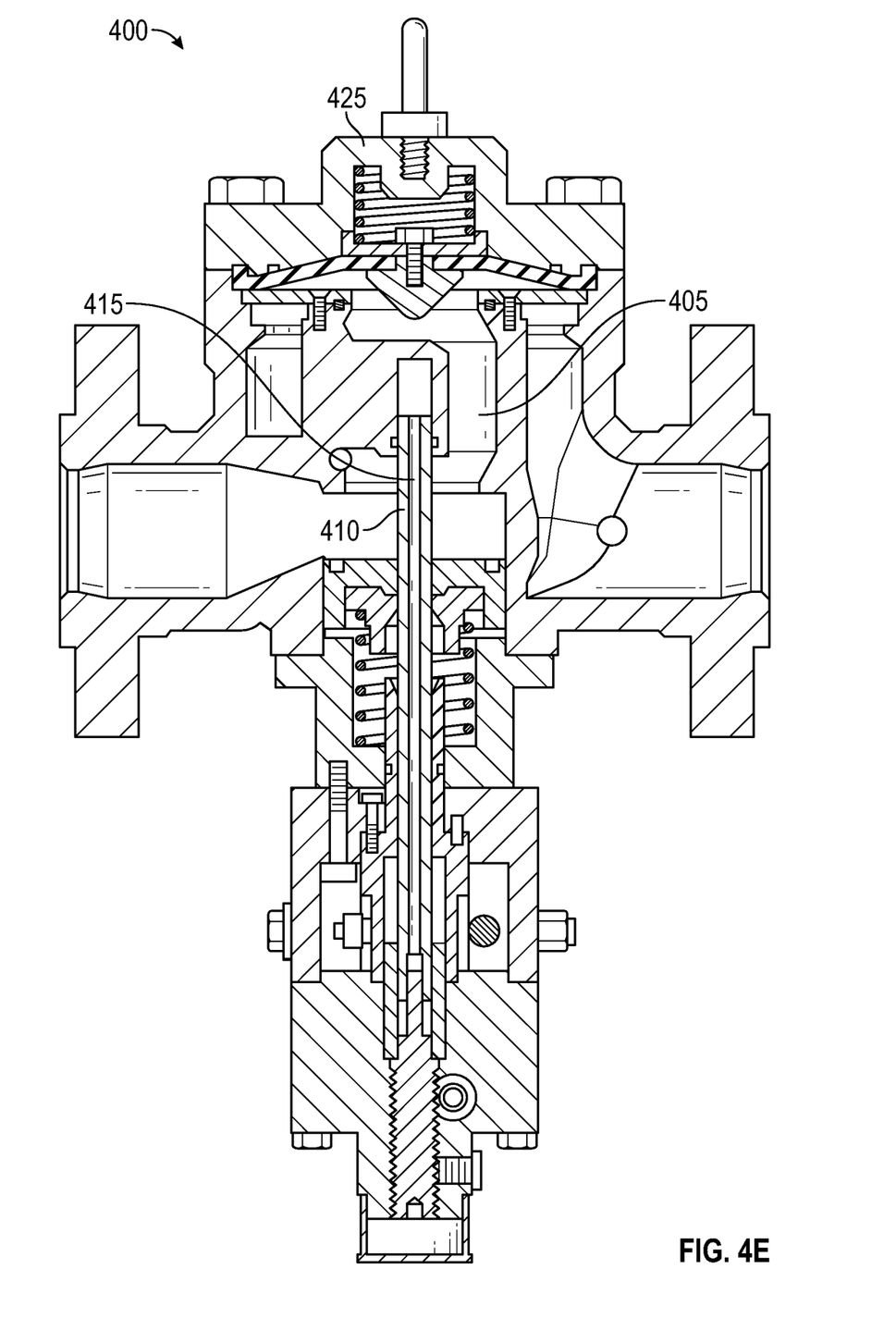

FIGS. 4A, 4B, 4C and 4D illustrate a gas regulator 400 for increased flow rate according to this disclosure. FIG. 4A illustrates a cross section of the gas regulator 400 according to this disclosure. FIG. 4B illustrates a connected vent line according to this disclosure. FIG. 4C illustrates an impulse line on both sides of the main valve housing according to this disclosure. FIG. 4D illustrates a gas regulator 400 with an internal vent line and increased flow rate according to this disclosure. The embodiment of the gas regulator 400 illustrated in FIGS. 4A-4D are for illustration only. FIGS. 4A-4D do not limit the scope of this disclosure to any particular implementation.

The gas regulator 400 is structured for an increased flow rate in relation to the gas regulator 300. The gas regulator 400 includes an internal chamber 405, a valve rod 410, a vent line 415, an impulse line 420, a housing 425, a setting mechanism 430, a vent chamber 435, and valve 440. The valve rod cast guidance 2 of valve rod 410 is turned 90° from the valve rod 410 and connected with the outer wall of the internal chamber 405.

The vent line 415 is relocated in the interior of the valve rod 410 to vent the excess gas out of the housing at the base of the gas regulator 400. The vent line 415 runs down the center of the valve rod 410. The pressure equalization is accomplished by venting through the valve rod 410.

The setting mechanism 430 of the valve rod 410 is connected with the upper internal small chamber above the valve rod guidance, so this creates an ambient pressure inside and ensures force equilibrium due to pressure equalization above the valve rod. The setting mechanism 430 allows ambient air to enter the vent chamber 435 before the valve 440 is engaged to interrupt the flow of fluid through the interior chamber 405. The setting mechanism 430 then sets a ratio of a pressure of the ambient air in the vent chamber 435 to the maximum pressure of the fluid in the interior chamber 405. Once the fluid in the interior chamber 405 has a pressure over the maximum pressure, the ambient air is forced out of the vent chamber 435 through the vent line 415 in the valve rod 410. Once the ambient air is out of the vent chamber 435, the vent line 415 engages the valve 440 to interrupt the flow of fluid in the interior chamber 405. The air is vented out a vent hole 445 located at the base of the housing 425.

The impulse line 420 is moved in a manner to run across the width of the gas regulator 400 providing access connections on both sides. The location of the impulse line 420 is structured to run tangential to the internal chamber 405. A midpoint of the impulse line 420 is opened to the internal chamber.

In comparing the gas regulator 300 and the gas regulator 400, adding a second impulse line 320 opposite of the current impulse line 320 in gas regulator 300 would cause additional problems. A second impulse line 320 would add more parts, which would increase the cost and manufacturing time. A second impulse line would require reducing the size of the internal chamber 305 or increasing the size of housing 325, or both. A second impulse line 320 would alter the pressure readings of the first impulse line, which is why the impulse line 420 is connected at only one point of the internal chamber 405.

A sensor 102a, such as a pressure sensor, for a device 200 can be connected to the impulse line 420. The sensor 102a can mount to a pilot at one side of the gas regulator 300. The sensor 102a detects the pressure of the internal chamber 305 through the impulse line 420.

In comparing gas regulator 400 and gas regulator 300, the relocation of the vent line 415 and the impulse line 420 allows volume of the internal chamber 405 to be increased since the bores of the vent line 315 and impulse line 320 have been removed. Incorporating the vent line 415 into the valve rod provides for a housing 425 smaller and more compact than the housing 325, reduces the amount of parts in the gas regulator 400 from the amount of parts in the gas regulator 300. Adjusting the location and length of the impulse line 420 provides mounting options for pilots on opposite sides of the housing 425.

Figure 5:
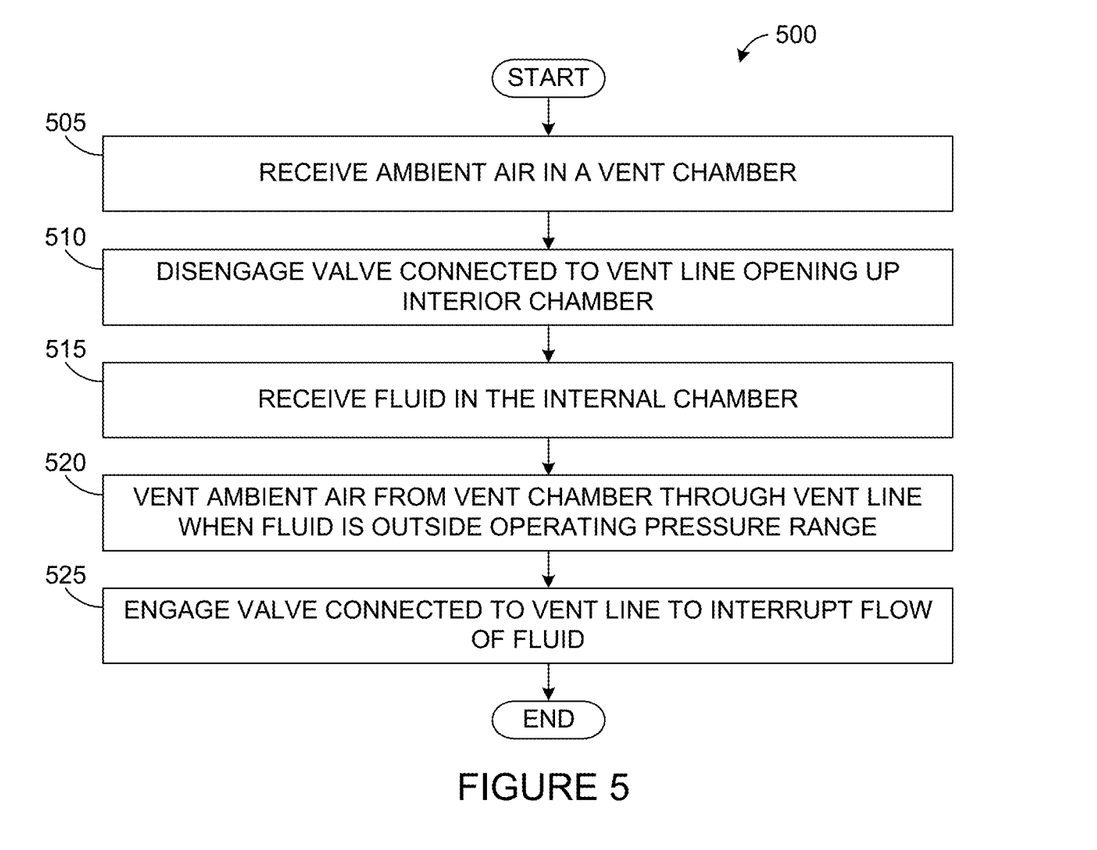
FIG. 5 illustrates an example method for force equilibrium of a valve rod due to internal pressure equalization according to this disclosure.

FIG. 5 illustrates an example method for force equilibrium of a valve rod due to internal pressure equalization according to this disclosure. For example, the method described in FIG. 5 may be performed in conjunction with the gas regulator 400 in FIG. 4.

In operation 505, the safety shut-off valve receives ambient air in a vent chamber. The ambient air can be at an ambient pressure to initialize the safety shut-off valve. The ambient air is received in the vent chamber through the vent hole at the base of the housing through the vent line located at a center of valve rod.

In operation 510, the safety shut-off valve disengages a valve connected to the vent line opening up an interior chamber. The ambient air fills the vent chamber, which causes the valve rod to disengage the valve. When the valve is disengaged, a path for the fluid to flow through the interior chamber is exposed.

In operation 515, the safety shut-off valve receives fluid in an internal chamber 405. In certain embodiments, the fluid is a gas, such as natural gas, nitrogen, butane, propane, carbon dioxide, landfill gas, air, hydrogen, coke oven gas, argon, etc. The fluid is received through an inlet of the housing. The fluid received experiences pulsations due to a pump located upstream that is moving the fluid. The pulsation could cause the pressure of the fluid to rise or fall outside an operating range that the safety shut-off valve is set to regulate.

The gas regulator 400 regulates the fluid using a pilot controlled diaphragm. The valve rod 410 moves to interrupt the fluid entering the internal chamber 405 and the outlet of the regulator.

The impulse line 420 is located in the housing 425 and connected to the internal chamber 405. The impulse line 420 runs tangentially to the internal chamber 405. The impulse line 420 fluidly communicates with the internal chamber 405 at a midpoint and runs to opposite sides of the housing 425. At each side of the housing, a pilot connection allows connection by a pilot or manometer to either side of the housing.

In operation 520, the gas regulator 400 vents the ambient air from the vent chamber through a vent line 415 located in a valve rod 410 when the fluid is outside the operating pressure range. The vent line 415 provides internal pressure to the valve rod 410. Due to the internal pressure, the valve rod 410 experiences pressure equalization with external pressure and forces. The ambient air is released from the regulator through a vent hole at the base of the housing. The vent hole used for both receiving and releasing ambient air from the safety shut-off valve.

In operation 525, the safety shut-off valve engages the valve connected to the vent line to interrupt a flow of the fluid.

Although FIG. 5 illustrates one example of a method 500 for force equilibrium of a valve rod due to internal pressure equalization, various changes may be made to FIG. 5. For example, various steps shown in FIG. 5 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A safety shut-off valve for use with a gas regulator, the safety shut-off valve comprising:
 a housing including an internal chamber configured to regulate pressure in a fluid;

a valve rod disposed in the housing and configured to control a valve for interrupting the fluid in the internal chamber;

a vent chamber configured to receive ambient air and to maintain pressure equalization of the ambient air and the fluid within a maximum pressure of the fluid;

a vent line disposed in a center of the valve rod and configured to provide fluid communication of the ambient air between the vent chamber and an outside of the housing; and a setting mechanism configured to set a ratio of a pressure of the ambient air to the maximum pressure of the fluid.

2. The gas regulator of claim 1, wherein the vent line is further configured to vent the ambient air from the vent chamber.

3. The gas regulator of claim 1, wherein the vent line is further configured to vent the ambient air from the vent chamber when a pressure of the fluid is above the maximum pressure.

4. The gas regulator of claim 1, wherein the vent line is further configured to provide the ambient air to the vent chamber before the valve disengages allowing fluid to flow through the interior chamber.

5. The gas regulator of claim 1, further comprising an impulse line in the housing and connected to the internal chamber.

6. The gas regulator of claim 5, wherein the impulse line runs tangentially to the internal chamber.

7. The gas regulator of claim 5, wherein the impulse line runs to opposite sides of the housing.

8. The gas regulator of claim 1, wherein a valve rod cast guidance is connected with an outer wall of the internal chamber.

9. A valve rod located in a housing of a safety shut-off valve for use with a gas regulator, the valve rod comprising:

a vent chamber configured to receive ambient air and to maintain pressure equalization of the ambient air and a fluid within a maximum pressure of the fluid; and a vent line disposed in a center of the valve rod and configured to provide fluid communication of the ambient air between the vent chamber and an outside of the housing; and a setting mechanism configured to set a ratio of a pressure of the ambient air to the maximum pressure of the fluid, wherein the valve rod is configured to control a valve for interrupting the fluid in an internal chamber of the housing.

10. The valve rod of claim 9, wherein the vent line is further configured to vent the ambient air from the vent chamber.

11. The valve rod of claim 9, wherein the vent line is further configured to vent the ambient air from the vent chamber when a pressure of the fluid is above the maximum pressure.

12. The valve rod of claim 11, wherein the vent line is further configured to provide the ambient air to the vent chamber before the valve disengages allowing fluid to flow through the interior chamber.

13. A method for a safety shut-off valve for use with a gas regulator comprising:

providing fluid communication of ambient air between a vent chamber in a housing of a safety shut-off valve and an outside of the housing;

receiving ambient air in the vent chamber;

receiving fluid in an internal chamber in the housing;

maintaining pressure equalization of the ambient air and the fluid within a maximum pressure of the fluid;

interrupting the fluid received in the internal chamber using a valve connected to a valve rod; and setting a ratio of a pressure of the ambient air to the maximum pressure of the fluid using a setting mechanism.

14. The method of claim 13, wherein the vent line is further configured to vent the ambient air from the vent chamber.

15. The method of claim 13, further comprising:

venting, through the vent line, the ambient air from the vent chamber when a pressure of the fluid is above the maximum pressure.

16. The method of claim 15, further comprising:

providing, through the vent line, the ambient air to the vent chamber before the valve disengages allowing fluid to flow through the interior chamber.

17. The method of claim 13, further comprising supplying pressure of fluid in the internal chamber through an impulse line in the housing.

18. The method of claim 17, wherein the impulse line runs tangentially to the internal chamber.

19. The method of claim 17, wherein the impulse line runs to opposite sides of the housing.

20. The method of claim 13, wherein a valve rod cast guidance is connected with an outer wall of the internal chamber.

* * * * *